(12) United States Patent
Elsokary et al.

(10) Patent No.: US 11,617,460 B2
(45) Date of Patent: Apr. 4, 2023

(54) SMART LIQUID CONTAINING SYSTEM

(71) Applicants: Ahamed Elsokary, Spring, TX (US); Mamoon Braiga, Richmond, TX (US)

(72) Inventors: Ahamed Elsokary, Spring, TX (US); Mamoon Braiga, Richmond, TX (US)

(*) Notice: Subject to any disclaimer, the term of this patent is extended or adjusted under 35 U.S.C. 154(b) by 106 days.

(21) Appl. No.: 17/176,840

(22) Filed: Feb. 16, 2021

(65) Prior Publication Data
US 2022/0257035 A1    Aug. 18, 2022

(51) Int. Cl.
| | |
|---|---|
| A47G 19/22 | (2006.01) |
| G08B 21/08 | (2006.01) |
| G08B 21/02 | (2006.01) |
| A47G 23/16 | (2006.01) |
| G08B 21/18 | (2006.01) |
| H04L 67/10 | (2022.01) |
| A61J 9/08 | (2006.01) |
| A45F 3/18 | (2006.01) |

(52) U.S. Cl.
CPC ......... *A47G 19/2227* (2013.01); *A47G 23/16* (2013.01); *G08B 21/02* (2013.01); *G08B 21/182* (2013.01); *H04L 67/10* (2013.01); *A45F 3/18* (2013.01); *A47G 2019/225* (2013.01); *A47G 2019/2238* (2013.01); *A47G 2019/2244* (2013.01); *A61J 9/085* (2013.01); *A61J 2200/70* (2013.01)

(58) Field of Classification Search
CPC ............... A47G 19/2227; A47G 23/16; A47G 2019/2238; A47G 2019/2244; A47G 2019/225; G08B 21/02; G08B 21/182; H04L 67/10; A45F 3/18; A61J 9/085; A61J 2200/70
See application file for complete search history.

(56) References Cited

U.S. PATENT DOCUMENTS

| | | | |
|---|---|---|---|
| 9,151,605 B1 | 10/2015 | Sweeney et al. | |
| 10,433,666 B1* | 10/2019 | Jovanov | B65D 43/0202 |
| 10,501,246 B1* | 12/2019 | Bowles | B65D 41/0492 |
| 10,683,197 B1* | 6/2020 | Paben | B65D 51/245 |
| 11,337,533 B1* | 5/2022 | Perrelli | A47G 19/2227 |
| 2014/0354438 A1* | 12/2014 | Hazen | A47G 19/2205 |
| | | | 73/290 R |

(Continued)

FOREIGN PATENT DOCUMENTS

| | | |
|---|---|---|
| CN | 204838908 U * | 12/2015 |
| CN | 206491620 U * | 9/2017 |

(Continued)

*Primary Examiner* — Chico A Foxx
(74) *Attorney, Agent, or Firm* — Boris Leschinsky

(57) ABSTRACT

A system including: a container device, wherein said container device is configured to track or monitor a consumption of a liquid stored in said container device; a container body that is configured to store the liquid of which consumption of the liquid is tracked or monitored, in which said container body comprises a double walled container body for insulation; a container lid that is configured to prevent the liquid from escaping said double walled container body; a capacitive sensor, wherein said capacitive sensor is configured to monitor the liquid flowing in and out of said double walled container body; and an accelerometer implement, wherein said accelerometer implement is configured to determine a tilt of said double walled container body.

20 Claims, 9 Drawing Sheets

(56) References Cited

U.S. PATENT DOCUMENTS

| | | | | |
|---|---|---|---|---|
| 2015/0122688 A1* | 5/2015 | Dias | ............ | A47G 19/027 |
| | | | | 206/459.1 |
| 2016/0025545 A1* | 1/2016 | Saltzgiver | ............ | B65D 51/245 |
| | | | | 73/304 C |
| 2016/0135626 A1* | 5/2016 | Pfeiffer | ............ | B65D 51/1644 |
| | | | | 206/459.1 |
| 2016/0169719 A1 | 6/2016 | Choi | | |
| 2016/0286993 A1* | 10/2016 | Pau | ............ | A47G 19/2288 |
| 2017/0238744 A1* | 8/2017 | Sweeney | ............ | G01F 13/006 |
| 2017/0340147 A1* | 11/2017 | Hambrock | ............ | G01F 23/804 |
| 2018/0084943 A1* | 3/2018 | Alexander | ............ | A47J 36/2466 |
| 2018/0197629 A1* | 7/2018 | Zhou | ............ | G16H 20/60 |
| 2019/0021529 A1* | 1/2019 | Schucker | ............ | A47G 19/12 |
| 2019/0125063 A1* | 5/2019 | Sengupta | ............ | A61B 5/6887 |
| 2020/0029714 A1* | 1/2020 | Nguyen | ............ | C02F 1/325 |
| 2020/0339309 A1* | 10/2020 | Krafft | ............ | G01K 1/14 |

FOREIGN PATENT DOCUMENTS

| | | | | | |
|---|---|---|---|---|---|
| CN | 110024705 | A | * | 7/2019 | |
| CN | 212307463 | U | * | 1/2021 | |
| GB | 2381185 | A | * | 4/2003 | ............ A47G 19/025 |
| GB | 2452930 | A | * | 3/2009 | ............ G01K 1/14 |
| KR | 20080069375 | A | * | 1/2007 | ............ A47G 19/2227 |

\* cited by examiner

SMART LIQUID CONTAINING SYSTEM

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a beverage container. More particularly, certain embodiments of the invention relate to a smart beverage container.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

As smart devices have become more and more common in modern society, the integration of smart devices in everyday life has facilitated data gathering, especially for health-related information. Such health-related information may be used to track a user's progress and keep the user accountable for maintaining a healthy lifestyle. For example, in many cases, the amount of water the user has consumed throughout a given day may be one statistic that may be desirable to track. Insufficient water consumption may cause health-related problems such as, but not limited to, fatigue, constipation, dizziness, etc.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that conventional smart beverage containers may be used to track water consumption. Such smart beverage containers use various different types of technology to track the amount of water a user consumes. For example, without limitation, an accelerometer may be used to determine an angle of the smart beverage container, and use the tilt data to determine the amount of water that a user has consumed. Such a mechanism does not confirm that the water was consumed and data may be falsified by a user by simply pouring water out of the smart beverage container. Additionally, a smart straw may be used to track water consumption. However, the use of a smart straw may limit a user to only one means drinking water, and may not be desirable for all users. Other conventional means of tracking water consumption may be similarly inaccurate or inconvenient.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1A:
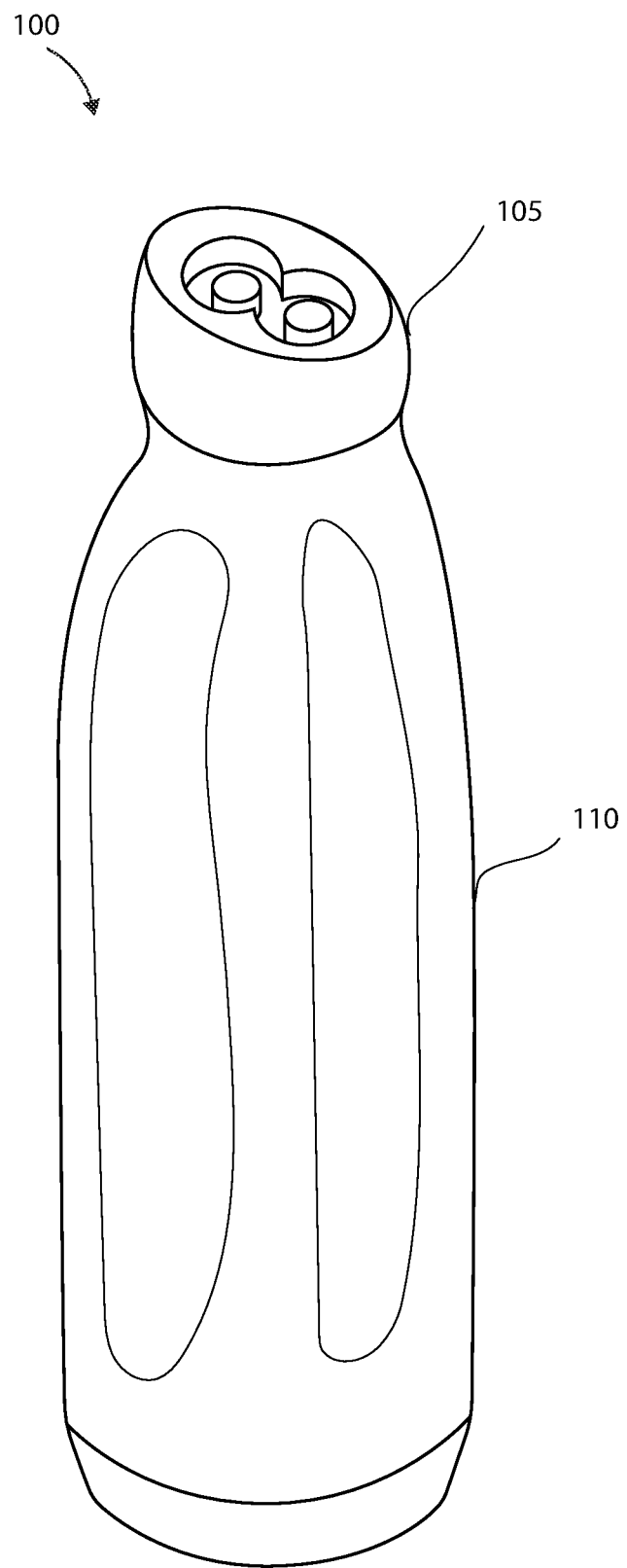
FIGS. 1A-1B illustrate an exemplary smart beverage container, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearward most point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them— Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

While embodiments herein may be discussed in terms of a processor having a certain number of bit instructions/data, those skilled in the art will know others that may be suitable such as 16 bits, 32 bits, 64 bits, 128 s or 256 bit processors or processing, which can usually alternatively be used. Where a specified logical sense is used, the opposite logical sense is also intended to be encompassed.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 1B:
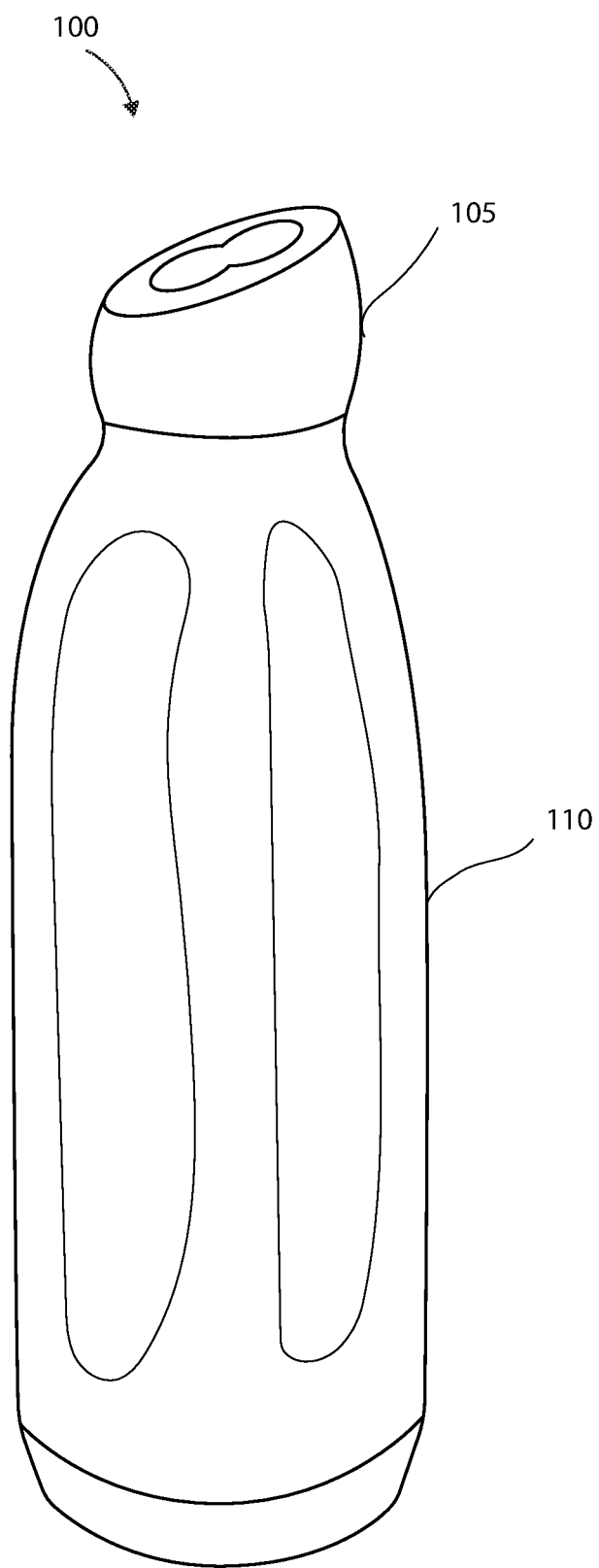

FIGS. 1A-1B illustrate an exemplary smart beverage container, in accordance with an embodiment of the present invention. Smart beverage container 100 may be used to store any type of liquid of which a user may want to track the consumption. For example, without limitation, smart beverage container 100 may be used to store water, tea, soda, coffee, milk, etc. Smart beverage container 100 may comprise two main parts: smart beverage container lid 105 and smart beverage container body 110. Smart beverage container lid 105 may be secured to smart beverage container body 110 in order to prevent liquid from escaping smart beverage container body 110. In some embodiment, smart beverage container 100 may be of a cylindrical shape as depicted in FIGS. 1A-1B. However, as will be appreciated by one skilled in the art, smart beverage container 100 may be other shapes, such as, but not limited to, substantially rectangular, complex, irregular, etc. Additionally, smart beverage container body 110 may be of various different sizes. For example, without limitation, smart container body 110 may be about 12 ounces, 18 ounces, 40 ounces, 64 ounces, etc. Smart container body 110 may be composed of any durable, water proof material, such as, but not limited to, plastic, stainless steel, glass, aluminum, rubber, ceramic, marble, wood, metal composites, titanium, etc. Smart container body 110 may also be sectioned into two parts, allowing for more compact storage, ease of cleaning, providing a larger opening for storage of, for example, without limitation, ice, etc.

Figure 2:
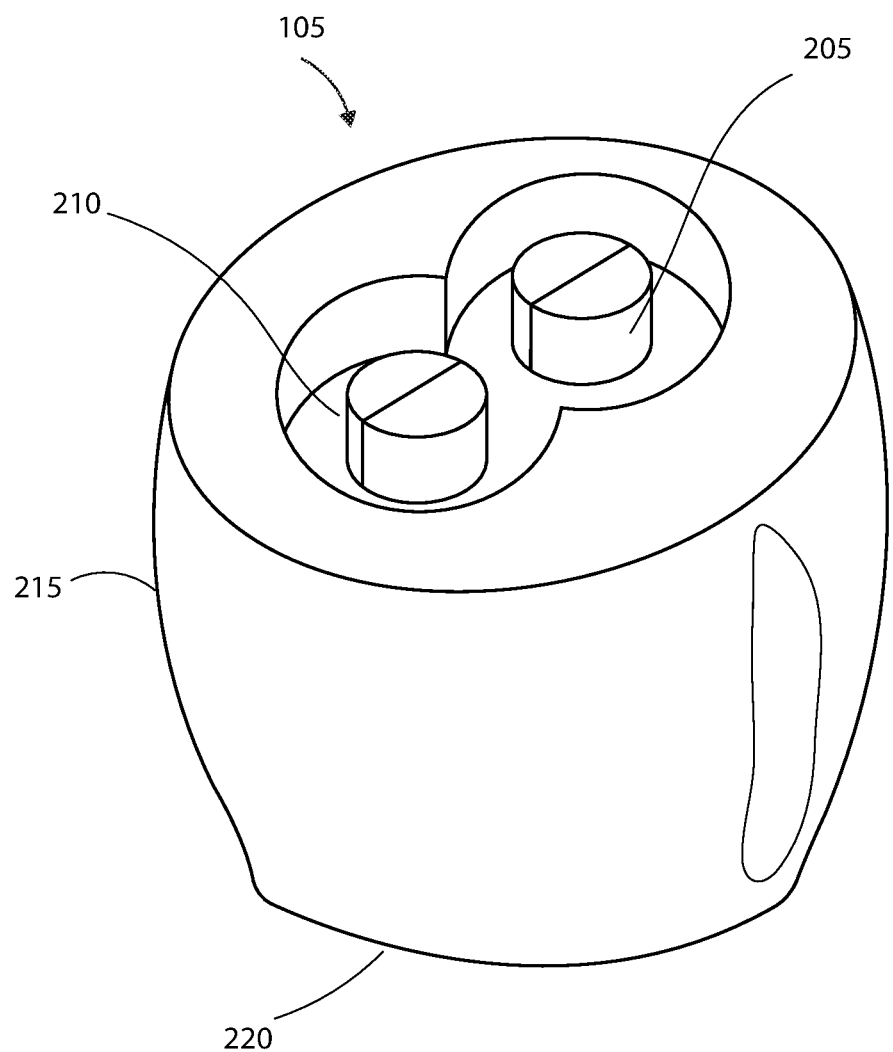
FIG. 2 illustrates an exemplary smart beverage container lid, in accordance with an embodiment of the present invention.

FIG. 2 illustrates an exemplary smart beverage container lid, in accordance with an embodiment of the present invention. With reference to both FIGS. 1A-1B and FIG. 2, smart beverage container lid 105 may be removable from smart beverage container 100 to allow a user to access liquid stored within smart beverage container 100. Opening 205 may be used by a user to drink the liquid stored within smart beverage container 100. Additionally, a straw may be coupled to smart beverage container lid 105 and straw opening 205, allowing a user another means of accessing the liquid stored in smart beverage container 100. In normal circumstances, straw opening 205 may be sealed shut to prevent liquid from escaping from smart beverage container 100. Pressure opening 210 may be used to release pressure from smart beverage container 100. For example, without limitation, when a carbonated beverage is stored within smart beverage container 100, pressure opening 210 may be slowly opened to gradually release any pressure built up within smart beverage container 100. Additionally, when a user is drinking a beverage from opening 205, pressure opening 210 may be opened to relieve pressure from smart beverage container 205 and allow for a steady flow of liquid from opening 205. Body 215 of smart beverage container lid 105 may contain electronic components allowing for tracking of water consumption such as, without limitation, a temperature sensor, accelerometer, connectivity hardware, etc. Threading 220 may be used to create a water tight seal with smart beverage container 100, and may ensure that a water tight seal is made using any means known in the art, such as, without limitation, O-rings, etc. As will be appreciated by one skilled in the art, other types of lids may be used with smart beverage container 100 such as, without limitation, a bite valve lid, a straw lid, a screw cap lid, a flip top lid, a travel mug lid, baby bottle lid, etc.

Figure 3:
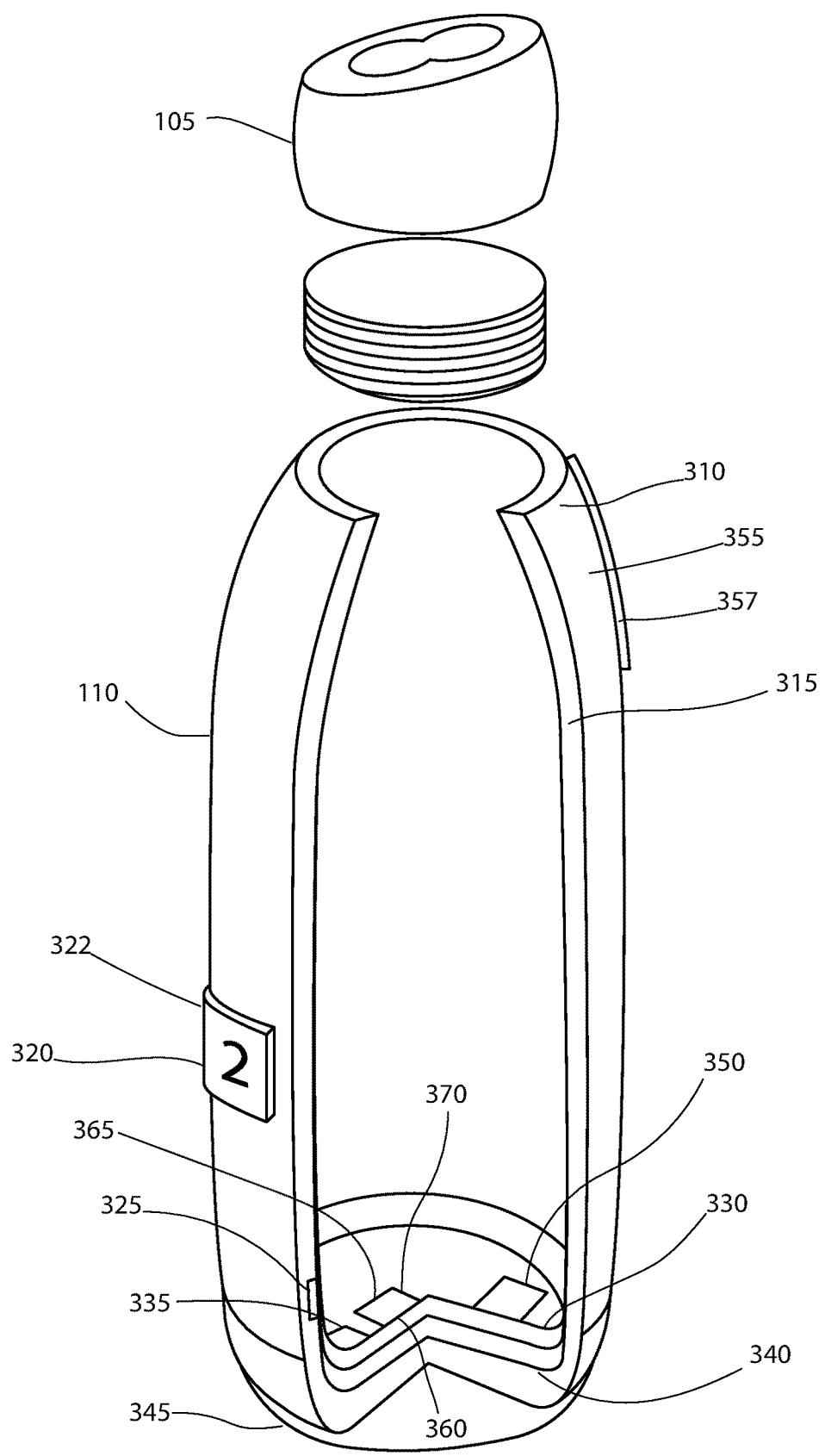
FIG. 3 illustrates a cross section view of an exemplary smart beverage container, in accordance with an embodiment of the present invention.

FIG. 3 illustrates a cross section view of an exemplary smart beverage container, in accordance with an embodiment of the present invention. With reference to both FIGS. 1A-1B and FIG. 3, smart beverage container 100 may comprise of smart beverage container lid 105 and smart beverage container body 110. In one embodiment, electric components such as, without limitation, battery 330, temperature sensor 325, pressure sensor 335, accelerometer 340, charging means 345, display 320, processor 365, memory 370, etc. arranged in main board 360, may be contained in smart beverage container body 110. However, as will be appreciated by one skilled in the art, the electrical components may also be contained within smart beverage container lid 105. Mouth 305 may be an opening in which smart beverage container lid 105 may be inserted, and provides access to the inside portion of smart beverage container body 110. As will be appreciated by one skilled in the art, mouth 305 may be of different diameters depending on the needs of the user. For example, without limitation, mouth 305 may be wide in order to accommodate for ice cubes, skinny for a smaller overall design, etc. In order to track fluid consumption, smart beverage container may include capacitive sensor 310 around mouth 305. Capacitive sensor 310 may be used to monitor fluid flowing in and out of smart beverage container 305. The capacitive sensor includes a capacitive sensing ring 355 which may be used to verify human contact (i.e. the lips of a user) in order to accurately measure fluid consumption. Capacitive sensing ring 355 may be made of metal material. Capacitive sensing ring 355 may be directly processed or incorporated into the upper shell of the plastic outer cup by in-mold injection molding and is connected to the main board 360 through a flexible PCB 357. Capacitive sensing ring 355 may realize the perception of human touch. Capacitive sensor 310 may be any type of capacitive sensor capable of verifying human contact, such as, without limitation, mutual capacitance, self or absolute capacitance, etc. Additionally, in an additional embodiment, smart beverage container 110 may include double wall vacuum insulation 315 to allow smart beverage container 100 to maintain the temperature of any liquid to be stored within smart beverage container body 110. Additional attachments may be used in combination with smart beverage container 100, such as, without limitation, a water filter, a tea strainer, a handle, a sleeve, etc.

Smart beverage container 100 may contain several electronic components that increase the capabilities of smart beverage container 100 beyond that of a traditional beverage container. Display implement 320 may be used to display relevant information to a user, such as, without limitation, water temperature, fluid capacity, internal pressure, date, time, battery status, custom messages, liquid/water purity, emojis, communication status, container status, etc. Display 320 may be any type of display known in the art, such as, without limitation, a Liquid Crystal Display (LCD), Light Emitting Diode (LED) screen, LED dot matrix display, a plurality of LEDs, ELD (electroluminescent), PDPD (PLASMA), Quantum dot (QLED), TFT (thin-film transmitter), a plurality of indicator lights, etc. Display 320 may be coupled to sound indicator/emitter 322 for sounding emergency or alarm conditions in the container and its contents such as but not limited to very hot beverage, high pressured beverage, etc. Smart beverage container 100 may also contain a variety of different sensors, such as, without limitation, temperature sensor 325, pressure sensor 335, accelerometer implement 340, liquid/water purity sensor, capacitive sensor, processor 365, memory 370, etc. arranged in main board 360. Temperature sensor 325 may be used to monitor the temperature of a liquid stored within smart beverage container 100. Sensor data may be used to, for example, without limitation, steep tea at a specific temperature, determine liquid temperature at about 109 degrees F. and above to prevent burning of a user, inform the user of comfortable drinking temperature of beverages (e.g. 55 degrees and below), etc. Pressure sensor 335 may be used to monitor the internal pressure of smart beverage container 100. Pressure data may be useful, for example, without limitation, while storing carbonated beverages, hot beverages, etc. and may be used to warn a user via display 320 and/or sound indicator/emitter 322 when pressure is excessively high (e.g. "High Pressure") or the contents are too hot (e.g. "Hot Liquid") for consumption in smart beverage container 100. Accelerometer implement 340 may be used to determine the tilt of smart beverage container 100, and may be one means of determining fluid consumption in combination with capacitive sensor 310. With multiple means of determining fluid consumption, a more accurate determination of fluid consumption may be obtained. Smart beverage container 100 may also contain battery 330 which may be used to power the electrical components of smart beverage container 100. Battery 330 may be a rechargeable battery or disposable batteries. If battery 330 is rechargeable, charging means 345 may be used to charge battery 330. Charging means 345 may be any type of charging means known in the art, such as, without limitation, wireless charging, cable charging, etc. Wireless communication means 350 may be used to communicate with an external device, such as, without limitation, a smart phone, laptop, notebook, desktop, portable computer, personal computer, tablet, smart watch, server, database, cloud, etc. Wireless communication means 350 may use any protocol known in the art, such as, without limitation, Wireless Fidelity (WiFi), Bluetooth, Internet, WAN, LAN, RF (radio frequency) and IR (infrared) and 3G, 4G, 5G, LTE, etc. Wireless communication means 350 may also be used to receive data from the external device. For example, without limitation, wireless communication means 350 may transmit and/or receive location related data from/to the external device in order to track the last known location of smart water container 100. Location data may be stored at the wireless communication means 350 and/or the external device and then uploaded to the cloud. Processor 365 and corresponding software application and algorithms stored in memory 370 may, but not limited to, coordinating all the different sensor functions in determining fluid consumption, displaying status conditions, emergency or alarm conditions, tracking human contact and liquid flow, monitoring location of the container, verifying liquid intake, battery charging, wired and/or wireless data communication to an external device, etc.

Data from smart beverage container 100 may be used locally or transmitted to an external device for various different purposes. Additionally, data may be synchronized with a cloud-based application for remote access to data. Smart beverage container 100 may be paired with, but not a limitation, a smart phone, portable computer, laptop, etc, for example, and used to send a user notification related to liquid consumption. For example, without limitation, a user may be notified when their beverage has reached a certain temperature, notified if the pressure inside smart beverage container 100 has exceeded a predetermined value, reminded throughout the day to consume a predetermined amount of liquid, notified if connection with smart beverage container 100 is lost (in order to prevent accidental misplacement of smart beverage container 100), notified of low fluid levels, etc. Smart beverage container 100 may also be used to track the number of calories consumed while drinking a beverage other than water. A user may input a beverage type using the user's smart device, portable computer, laptop, etc, and smart beverage container 100 may calculate the number of calories consumed based on the beverage type, capacitive sensor 310 and/or capacitive sensing ring 355, and optionally input calorie data in fitness tracking software applications. Smart beverage container 100 may also verify the consumption of the beverage by detecting a touch from capacitive sensing ring 355 and/or detecting a tilt with accelerometer 340. Additionally, smart beverage container 100 and/or paired external device may include social media integration, and information such as, without limitation, liquid consumption, surpassing liquid consumption goals, location information, etc. may be shared with social media connections.

Figure 4:
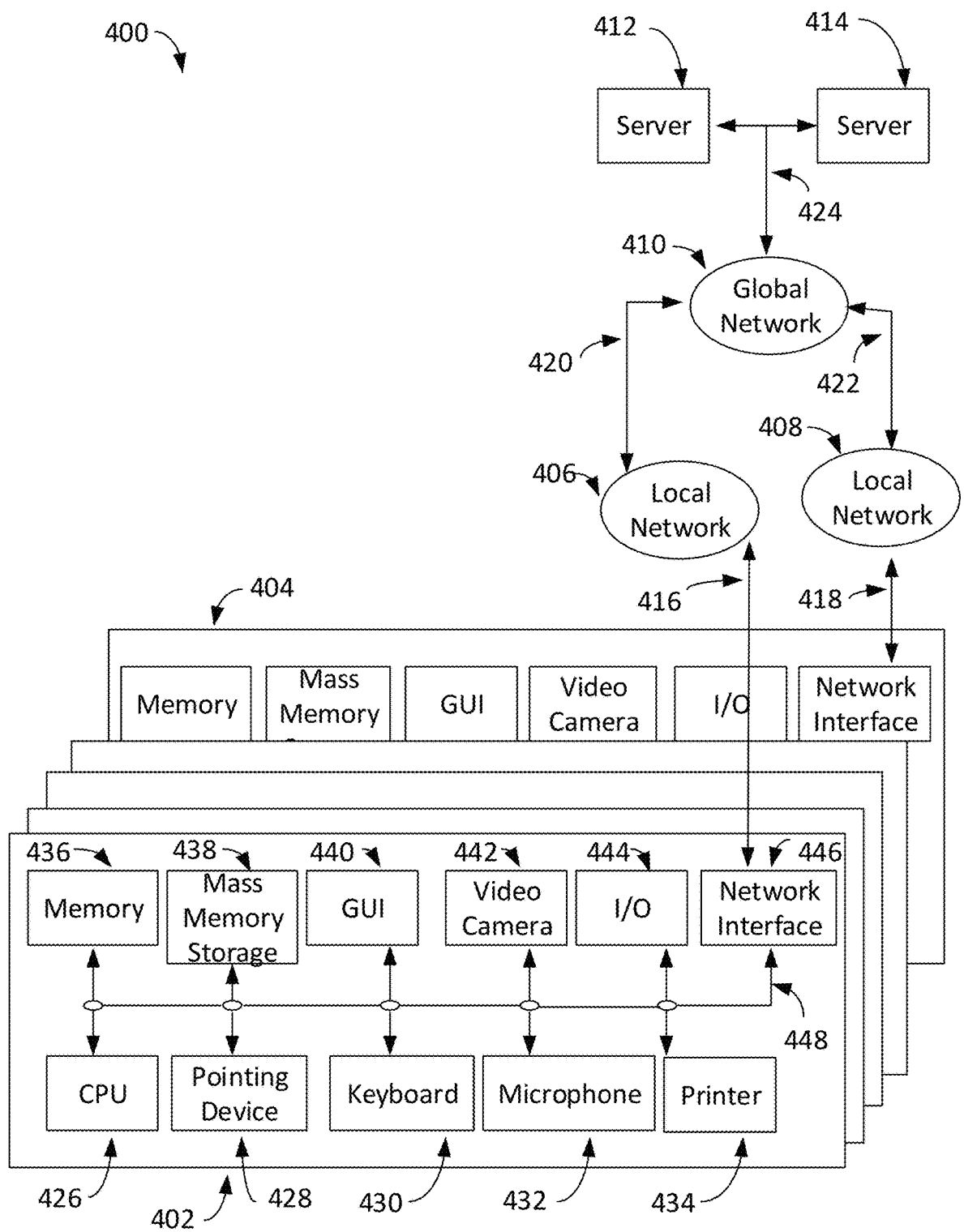
FIG. 4 is a block diagram depicting an exemplary client/server system which may be used by an exemplary web-enabled/networked embodiment of the present invention.

FIG. 4 is a block diagram depicting an exemplary paired client/server system which may be used by an exemplary web-enabled/networked embodiment of the present invention.

A communication system 400 may include one or more clients paired with smart beverage container 100 via wireless communication means 350, with a sampling of clients denoted as a client 402 and a client 404, a multiplicity of local networks with a sampling of networks denoted as a local network 406 and a local network 408, a global network 411 and a multiplicity of servers with a sampling of servers denoted as a server 412 and a server 414.

Client 402 may communicate data from smart beverage container 100 bi-directionally with local network 406 via a communication channel 416 for a cloud-based application. Client 404 may communicate bi-directionally data from smart beverage container 100 with local network 408 via a communication channel 418 for a cloud-based application. Local network 406 may communicate bi-directionally with global network 410 via a communication channel 420. Local network 408 may communicate bi-directionally with global network 410 via a communication channel 422. Global network 410 may communicate bi-directionally with server 412 and server 414 via a communication channel 424. Server 412 and server 414 may communicate bi-directionally with each other via communication channel 424. Furthermore, clients 402, 404, local networks 406, 408, global network 410 and servers 412, 414 may each communicate bi-directionally with each other.

In one embodiment, global network 410 may operate as the Internet. It will be understood by those skilled in the art that communication system 400 may take many different forms. Non-limiting examples of forms for communication system 400 include local area networks (LANs), wide area networks (WANs), wired telephone networks, wireless networks, or any other network supporting data communication between respective entities.

Clients 402 and 404 may take many different forms. Non-limiting examples of clients 402 and 404 may include but not limited to personal computers, personal digital assistants (PDAs), portable computers, laptop, tablet, smart watch, cellular phones and smartphones.

Client 402 includes a CPU 426, a pointing device 428, a keyboard 430, a microphone 432, a printer 434, a memory 436, a mass memory storage 438, a GUI 440, a video camera 442, an input/output interface 444 and a network interface 446.

CPU 426, pointing device 428, keyboard 430, microphone 432, printer 434, memory 436, mass memory storage 438, GUI 440, video camera 442, input/output interface 444 and network interface 446 may communicate in a unidirectional manner or a bi-directional manner with each other via a communication channel 448. Communication channel 448 may be configured as a single communication channel or a multiplicity of communication channels.

CPU 426 may be comprised of a single processor or multiple processors. CPU 426 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 436 is used typically to transfer data and instructions to CPU 426 in a bi-directional manner. Memory 436, as discussed previously, may include any suitable computer-readable media, intended for data storage, such as those described above excluding any wired or wireless transmissions unless specifically noted. Mass memory storage 438 may also be coupled bi-directionally to CPU 426 and provides additional data storage capacity and may include any of the computer-readable media described above. Mass memory storage 438 may be used to store programs, data including the operating status of smart beverage container 100 and the tracked condition and usage of its contents, location data of smart beverage container 100, and the like and is typically a secondary storage medium such as a hard disk. It will be appreciated that the information retained within mass memory storage 438, may, in appropriate cases, be incorporated in standard fashion as part of memory 436 as virtual memory.

CPU 426 may be coupled to GUI 440. GUI 440 enables a user to view the operation of computer operating system and software application including, but not limited to, the operating status of smart beverage container 100 and the condition of its contents. For example, without limitation, the temperature of a liquid stored within smart beverage container 100, the internal pressure of smart beverage container 100, a determination of fluid consumption, smart beverage container 100 battery status, location data, etc. CPU 426 may be coupled to pointing device 428. Non-limiting examples of pointing device 428 include computer mouse, trackball and touchpad. Pointing device 428 enables a user with the capability to maneuver a computer cursor about the viewing area of GUI 440 and select areas or features in the viewing area of GUI 440. CPU 426 may be coupled to keyboard 430. Keyboard 430 enables a user with the capability to input alphanumeric textual information to CPU 426. CPU 426 may be coupled to microphone 432. Microphone 432 enables audio produced by a user to be recorded, processed and communicated by CPU 426. CPU 426 may be connected to printer 434. Printer 434 enables a user with the capability to print information to a sheet of paper. CPU 426 may be connected to video camera 442. Video camera 442 enables video produced or captured by user to be recorded, processed and communicated by CPU 426.

CPU 426 may also be coupled to input/output interface 444 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 426 optionally may be coupled to network interface 446 which enables communication with an external device such as a database or a computer or telecommunications or internet network using an external connection shown generally as communication channel 416, which may be implemented as a hardwired or wireless communications link using suitable conventional technologies. With such a connection, CPU 426 might receive information from the network, or might output information to a network in the course of performing the method steps described in the teachings of the present invention.

Figure 5:
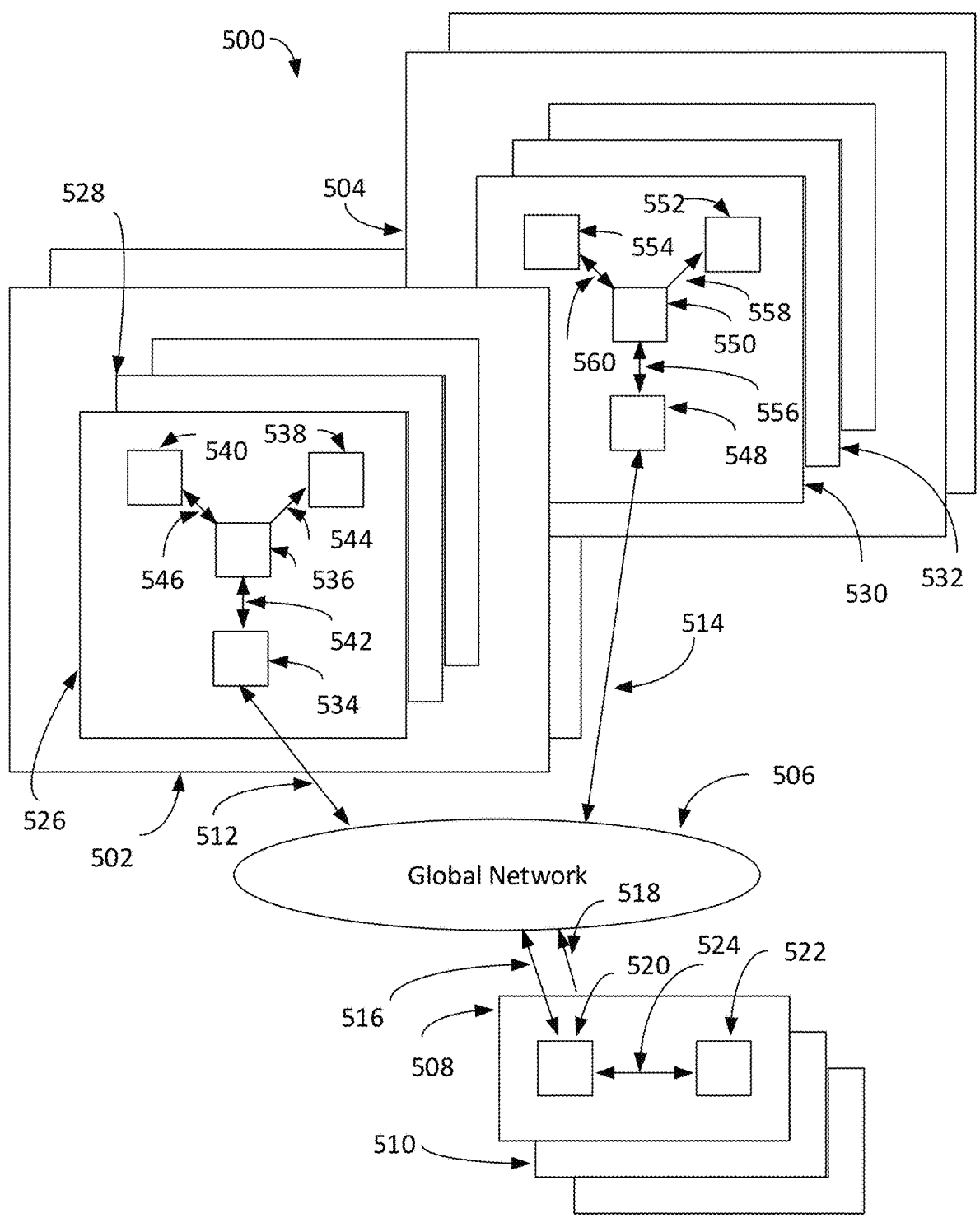
FIG. 5 illustrates a block diagram depicting a conventional client/server communication system, which may be used by an exemplary web-enabled/networked embodiment of the present invention.

FIG. 5 illustrates a block diagram depicting a conventional client/server communication system paired with smart beverage container 100 via wireless communication means 350, which may be used by an exemplary web-enabled/networked embodiment of the present invention.

A communication system 500 includes a multiplicity of networked regions with a sampling of regions denoted as a network region 502 and a network region 504, a global network 506 and a multiplicity of servers with a sampling of servers denoted as a server device 508 and a server device 510 for a cloud-based application.

Network region 502 and network region 504 may operate to represent a network contained within a geographical area or region. Non-limiting examples of representations for the geographical areas for the networked regions may include postal zip codes, telephone area codes, states, counties, cities and countries. Elements within network region 502 and 504 may operate to communicate with smart beverage container 100 directly or via clients 402 and 404 and other external elements within other networked regions or within elements contained within the same network region.

In some implementations, global network 506 may operate as the Internet. It will be understood by those skilled in the art that communication system 500 may take many different forms. Non-limiting examples of forms for communication system 500 include local area networks (LANs), wide area networks (WANs), wired telephone networks, cellular telephone networks or any other network supporting data communication between respective entities via hardwired or wireless communication networks. Global network 506 may operate to transfer information between the various networked elements.

Server device 508 and server device 510 may operate to execute software instructions, store information, support database operations, sync data of smart beverage container 100 with the cloud-based application, and communicate with other networked elements for remote access to data from smart beverage container 100. Non-limiting examples of software and scripting languages which may be executed on server device 508 and server device 510 include C, C++, C# and Java. Non-limiting examples of software applications, in accordance with an embodiment of the present invention, may include sending a user notification related to liquid consumption. For example, without limitation, a user may be notified when their beverage has reached a certain temperature, notified if the pressure inside smart beverage container 100 has exceeded a predetermined value, reminded throughout the day to consume a predetermined amount of liquid, notified if connection with smart beverage container 100 is lost (in order to prevent accidental misplacement of smart beverage container 100), notified of low fluid levels, etc. Smart beverage container 100 may also be used to track the number of calories consumed while drinking a beverage other than water. A user may input a beverage type using the user's smart device, portable computer, laptop, etc, and smart beverage container 100 may calculate the number of calories consumed, and optionally input calorie data in fitness tracking applications. Additionally, smart beverage container 100 and/or paired external device may include social media integration, and information such as, without limitation, liquid consumption, surpassing liquid consumption goals, location information, etc. may be shared with social media connections in the Internet.

Network region 502 may operate to communicate bi-directionally with global network 506 via a communication channel 512. Network region 504 may operate to communicate bi-directionally with global network 506 via a communication channel 514. Server device 508 may operate to communicate bi-directionally with global network 506 via a communication channel 516. Server device 510 may operate to communicate bi-directionally with global network 506 via a communication channel 518. Network region 502 and 504, global network 506 and server devices 508 and 510 may operate to communicate with each other and with every other networked device located within communication system 500.

Server device 508 includes a networking device 520 and a server 522. Networking device 520 may operate to communicate bi-directionally with global network 506 via communication channel 516 and with server 522 via a communication channel 524. Server 522 may operate to execute software instructions and store information.

Network region 502 includes a multiplicity of clients with a sampling denoted as a client 526 and a client 528. Client 526 includes a networking device 534, a processor 536, a GUI 538 and an interface device 540. Non-limiting examples of devices for GUI 538 include monitors, televisions, cellular telephones, smartphones, portable computers, laptop, tablet, smart watch, and PDAs (Personal Digital Assistants). Non-limiting examples of interface device 540 include pointing device, mouse, trackball, scanner and printer. Networking device 534 may communicate bi-directionally with global network 506 via communication channel 512 and with processor 536 via a communication channel 542. GUI 538 may receive information from processor 536 via a communication channel 544 for presentation to a user for viewing. Interface device 540 may operate to send control information to processor 536 and to receive information from processor 536 via a communication channel 546. Network region 504 includes a multiplicity of clients with a sampling denoted as a client 530 and a client 532. Client 530 includes a networking device 548, a processor 550, a GUI 552 and an interface device 554. Non-limiting examples of devices for GUI 538 include monitors, televisions, cellular telephones, smartphones, portable computers, laptop, tablet, smart watch, and PDAs (Personal Digital Assistants). Non-limiting examples of interface device 540 include pointing devices, mousse, trackballs, scanners and printers. Networking device 548 may communicate bi-directionally with global network 506 via communication channel 514 and with processor 550 via a communication channel 556. GUI 552 may receive information from processor 550 via a communication channel 558 for presentation to a user for viewing including, but not limited to, the operating status of smart beverage container 100, the tracked condition of its contents, and location data of the container. For example, without limitation, the temperature of a liquid stored within smart beverage container 100, the internal pressure of smart beverage container 100, a determination of fluid consumption, smart beverage container 100 battery status, location data, etc. may be viewed via GUI 552 and/or 538. Interface device 554 may operate to send control information to processor 550 and to receive information from processor 550 via a communication channel 560.

For example, consider the case where a user interfacing with client 526 may want to execute a networked application where a user may input a beverage type and smart beverage container 100 and/or client 526 may calculate the number of calories consumed based on the beverage type, capacitive sensor 310, and/or capacitive sensing ring 355, and optionally input calorie data in fitness tracking software applications. A user may enter the IP (Internet Protocol) address of smart beverage container 100 for the networked application using interface device 540. The IP address information may be communicated to processor 536 via communication channel 546. Processor 536 may then communicate the IP address information to networking device 534 via communication channel 542. Networking device 534 may then communicate the IP address information of smart beverage container 100 to global network 506 via communication channel 512. Global network 506 may then communicate the IP address information of smart beverage container 100 to networking device 520 of server device 508 via communication channel 516. Networking device 520 may then communicate the IP address information to server 522 via communication channel 524. Server 522 may receive the IP address information and after processing the IP address information may communicate return information to networking device 520 via communication channel 524. Networking device 520 may communicate the return information to global network 506 via communication channel 516. Global network 506 may communicate the return information to networking device 534 via communication channel 512. Networking device 534 may communicate the return information to processor 536 via communication channel 542. Processor 556 may communicate the return information to GUI 538 via communication channel 544. User may then view the return information on GUI 538 such as but not limited to liquid consumption, surpassing liquid consumption goals, location information, etc. The user may be notified when their beverage has reached a certain temperature, notified if the pressure inside smart beverage container 100 has exceeded a predetermined value, reminded throughout the day to consume a predetermined amount of liquid, notified if connection with smart beverage container 100 is lost (in order to prevent accidental misplacement of smart beverage container 100), notified of low fluid levels, etc.

Figure 6:
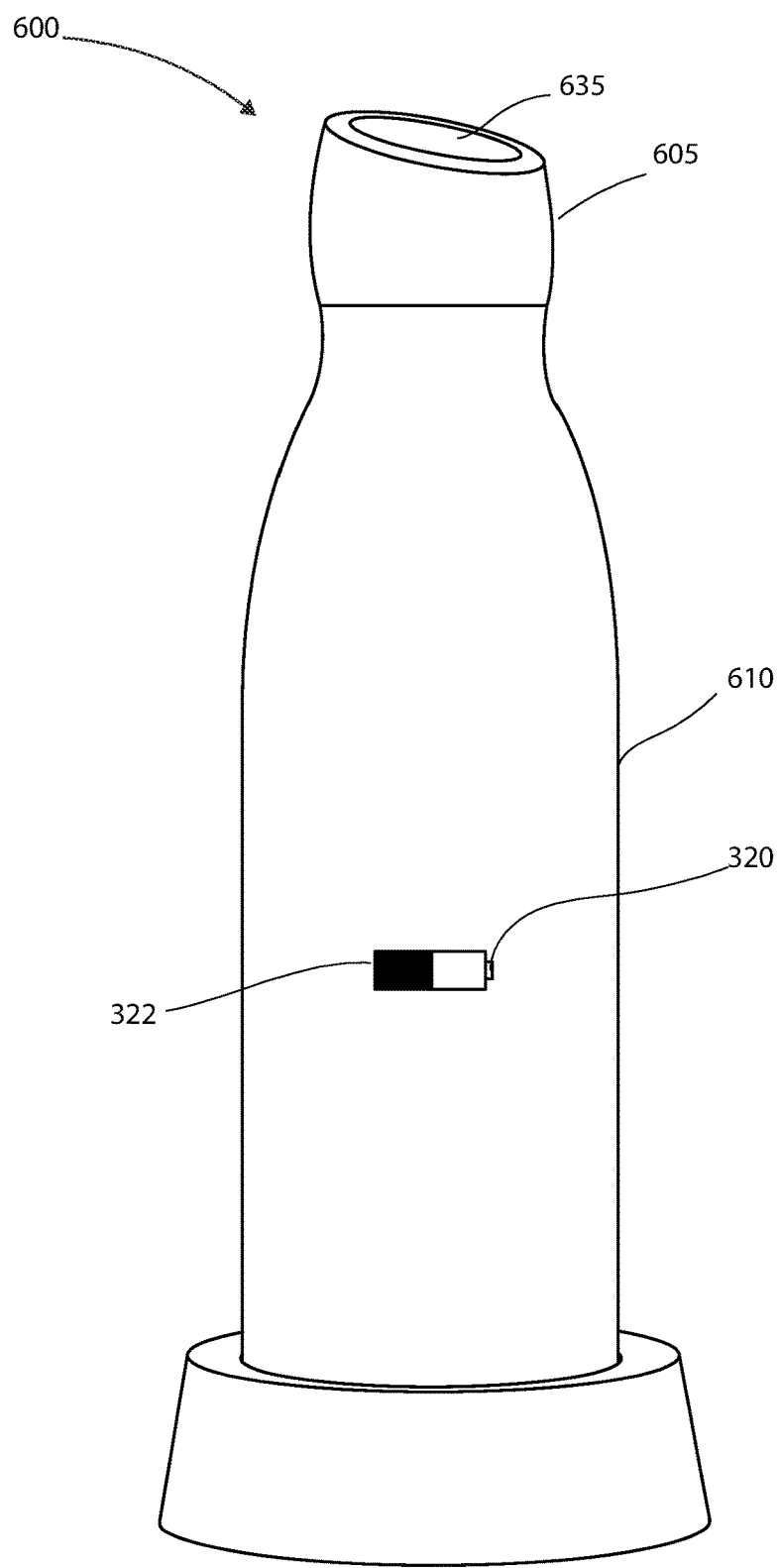
FIG. 6 illustrates an exemplary smart beverage container system, in accordance with an embodiment of the present invention.

FIG. 6 illustrates an exemplary smart beverage container system 600, in accordance with an embodiment of the present invention. Smart beverage container system 600 may be used to store any type of liquid of which a user may want to track the consumption. For example, without limitation, smart beverage container 600 may be used to store, but not limited to, water, tea, soda, coffee, milk, beverage, alcoholic drinks, etc. Smart beverage container system 600 may comprise three main parts: smart beverage container lid 605, smart beverage container body 610, and wireless charging base 625. Smart beverage container lid 605 may be secured to smart beverage container body 610 in order to prevent liquid from escaping smart beverage container body 610. Smart beverage container lid 605 may include lifting ring 635 to aid a user in removing the container lid from the container body. Smart beverage container body 610 may include display 320 to display relevant information to a user and product logo 620. Display 320 may be coupled to sound indicator/emitter 322 for sounding status or emergency conditions of the container and its contents such as but not limited to very hot beverage, high pressured beverage, etc. Wireless charging base 625 may charge battery 330 through wireless charging means 345 and may include the product logo 630 in a middle portion of the base. The product logo may be inscribed with laser carving, fiber lasers, diode lasers, infrared lasers, metal or plastic etching, engraving machines, permanent markers, etc.

Figure 7:
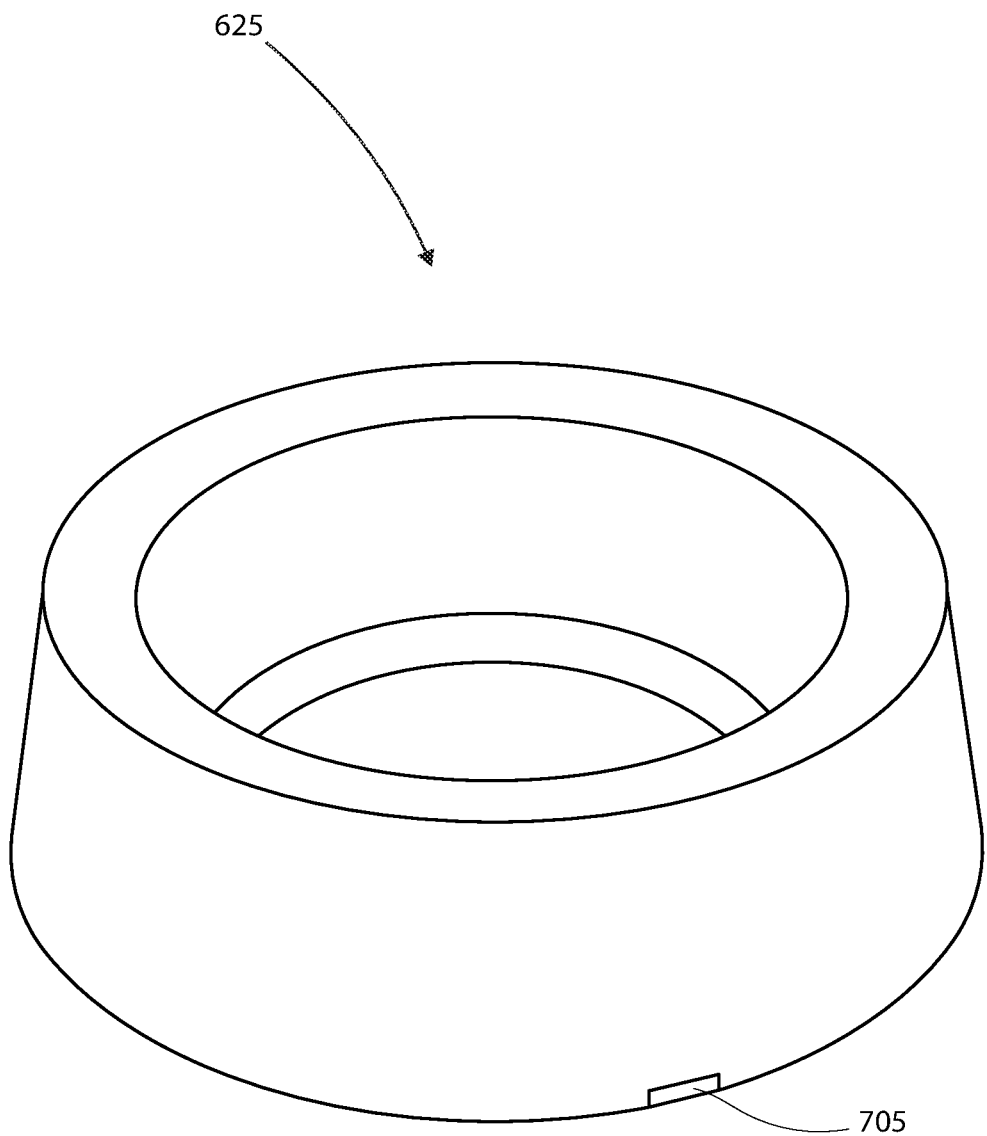
FIG. 7 illustrates an exemplary wireless charging base, in accordance with an embodiment of the present invention.

FIG. 7 illustrates an exemplary wireless charging base 625, in accordance with an embodiment of the present invention. With reference to both FIGS. 6-7, power may be provided through Type C charging or power port 705 disposed on a bottom of the wireless charging base 625. And, the battery 330 may be recharged through wireless charging means 345 whenever smart beverage container body charging means 345 makes contact with wireless charging base 625. In another embodiment, charging or power port 705 may comprise, but not limited to, a Type A or micro-USB charging port.

Figure 8:
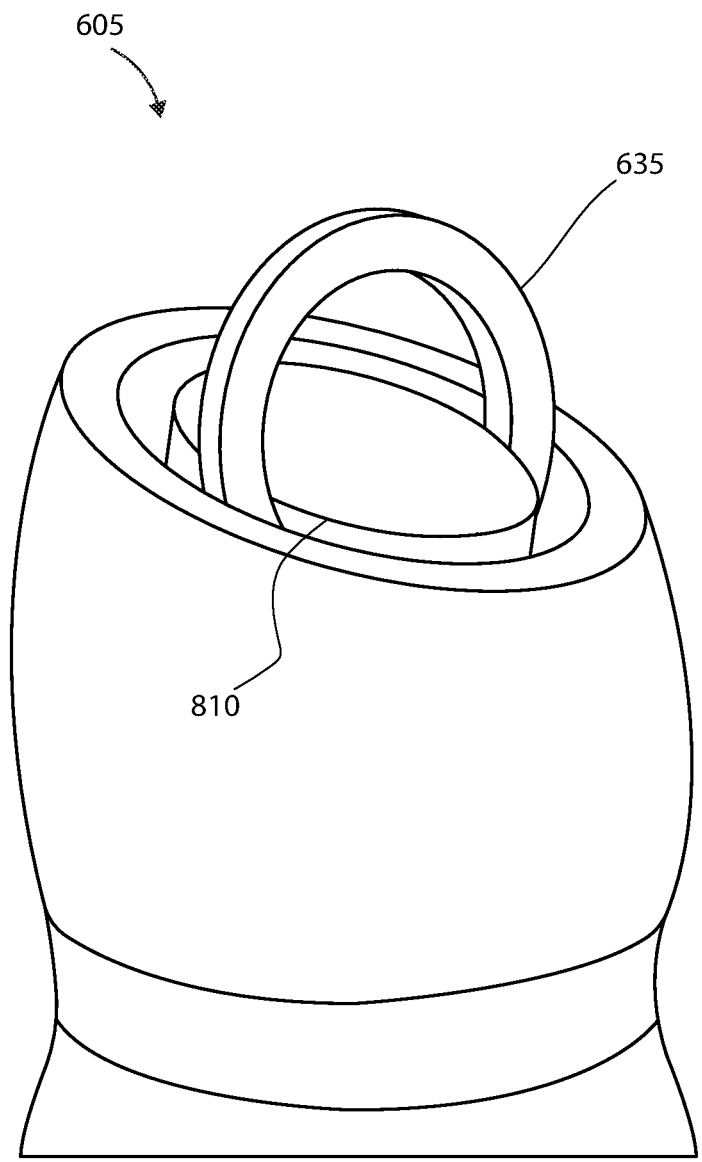
FIG. 8 illustrates an exemplary smart beverage container lid, in accordance with an embodiment of the present invention.

FIG. 8 illustrates an exemplary smart beverage container lid 605, in accordance with an embodiment of the present invention. With reference to both FIGS. 6 and 8, smart beverage container lid 105 may include lifting ring 805 and lid logo area 810. When lifting ring 805 is needed to, for example, eject or open the lid, one side of lifting ring 805 is pressed to eject lifting ring 805. When lifting ring 805 is not needed, the exposed part of the lifting ring may simply be pressed to hide the lifting ring in the container lid.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6)/(f) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6) pre-AIA or 35 USC § 112 (f) post AIA.

It is noted that according to USA law, all claims must be set forth as a coherent, cooperating set of limitations that work in functional combination to achieve a useful result as a whole. Accordingly, for any claim having functional limitations interpreted under 35 USC § 112 (6)/(f) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6)/(f) is/(are) dependent on one or more remote servers located outside the USA, it is intended that each such recited function under 35 USC § 112 (6)/(f) is to be interpreted as the function of the local system receiving the remotely generated information required by a locally implemented claim limitation, wherein the structures and or steps which enable, and breath life into the expression of such functions claimed under 35 USC § 112 (6)/(f) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present patent application, and "35 USC § 112 (6)/(f)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a smart beverage container according to the present invention will be apparent to those skilled in the art. Various aspects of the invention have been described above by way of illustration, and the specific embodiments disclosed are not intended to limit the invention to the particular forms disclosed. The particular implementation of the smart beverage container may vary depending upon the particular context or application. By way of example, and not limitation, the smart beverage container described in the foregoing were principally directed to fluid consumption tracking implementations; however, similar techniques may instead be applied to tea steeping applications, track baby milk/water consumption, track alcohol intake for the user and warning them about their limits they've set, etc. which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A system comprising:
   a container device having an external wall, wherein said container device is configured to track or monitor a consumption of a liquid stored in said device;
   a container device body configured to store the liquid of which consumption of the liquid is tracked or monitored;
   a container device lid configured to prevent the liquid from escaping said container device body;
   a straw opening in said container device lid, wherein said straw opening is configured to allow access to the liquid stored in said container device body;
   a pressure opening in said container device lid, wherein said pressure opening is configured to be operable for releasing any pressure built up within said container device body;
   a capacitive sensor located on the external wall of the container device below the container lid, wherein said capacitive sensor is configured to detect and verify human touch; and
   an accelerometer implement, wherein said accelerometer implement is configured to determine a tilt of said container device body,
   wherein the capacitive sensor and the accelerometer implement are used together to monitor the consumption of a liquid contained within the container device while the human touch is verified.

2. The system of claim 1 further comprising an LED display implement that is configured to display water temperature, fluid capacity, internal pressure, date, time, battery status, custom messages, liquid/water purity, emojis, communication status, container status, and/or emergency or alarm notification.

3. The system of claim 1, further comprising a temperature sensor that is configured to monitor a temperature of the liquid stored within said container device body.

4. The system of claim 3, wherein if the temperature of the liquid is above a predetermined high temperature, said display implement would be activated to show a "Hot Liquid" alarm notification.

5. The system of claim 3, further comprising a pressure sensor that is configured to monitor an internal pressure of said container device body.

6. The system of claim 5, wherein if the pressure of the liquid is above a predetermined high pressure, said display implement would be activated to show a "High Pressure" alarm notification.

7. The system of claim 5, further comprising a wireless communication unit configured to communicate with an external device, wherein sensor data from said container device is transmitted to an external device for synchronizing with a cloud-based application for remote access to the sensor data.

8. The system of claim 7, further comprising a rechargeable battery that is configured to power electrical components of container device body.

9. The system of claim 8, further comprising a charger configured to be operable for charging said rechargeable battery.

10. The system of claim 9, further comprising a wireless charging base configured to provide power to said charger.

11. The system of claim 10, further comprising:
    a processor;
    a memory component;
    a software algorithm stored in said memory component, wherein said software algorithm is configured to use data from said capacitive sensor and accelerometer implement to verify liquid intake; and
    a main board where electrical components are arranged.

12. The system of claim 9, wherein said smart beverage container body comprises a double wall vacuum insulation, wherein said double wall vacuum insulation is configured to maintain a temperature of the liquid stored within said container device body.

13. The system of claim 12, further comprising a capacitive sensing ring, wherein said capacitive sensing ring is configured to detect human contact.

14. The system of claim 13, wherein at least one of a capacitive sensor data, an accelerometer implement data, a pressure sensor data, a temperature sensor data, and a capacitive sensing ring is transmitted to an external device for synchronizing with a cloud-based application for remote access to the data and social media integration.

15. A system comprising:
    a container for storing a liquid of which consumption of the liquid is tracked or monitored, the container comprising an outer surface for holding the container;
    a container lid for preventing the liquid from escaping said container;
    a container opening for allowing access to the liquid;
    a first lid opening for releasing any pressure built up within said liquid container;
    a capacitance touch sensor located on the outer surface of container below the container lid and is configured to detect and verify human touch to assist in monitoring fluid flowing in and out of said liquid container;
    an accelerometer for determining a tilt of said liquid container;
    a display for visually showing at least one of;: water temperature, fluid capacity, internal pressure, date, time, battery status, custom messages, liquid/water purity, emojis, communication status, container status, and emergency or alarm notification;

a temperature sensor for monitoring a temperature of the liquid; and a pressure sensor for monitoring an internal pressure of the liquid stored in said liquid container, wherein the capacitive sensor and the accelerometer are used together to monitor the consumption of a liquid contained within the container while the human touch is verified.

16. The system of claim 15, further comprising a wireless communication unit configured to communicate with an external device, wherein at least one of a capacitive sensor data, an accelerometer implement data, a pressure sensor data, a temperature sensor data, is transmitted to the external device for synchronizing with a cloud-based application for remote access to the sensor data.

17. A system comprising:
a container device with an external wall, wherein said container device is configured to track or monitor a consumption of a liquid stored in said container devices;

a container body that is configured to store the liquid of which consumption of the liquid is tracked or monitored, in which said container body comprises a double walled container body for insulation;

a container lid that is configured to prevent the liquid from escaping said double walled container body;

a capacitive touch sensor on the external wall of the container device below the container lid, wherein said capacitive sensor is configured to detect and verify human touch to to assist in monitoring of the liquid flowing in and out of said double walled container body; and an accelerometer implement, wherein said accelerometer implement is configured to determine a tilt of said double walled container body, thereby based on known dimensions of the container body and together with the capacitive touch sensor providing for measuring of fluid consumption out of the container device while the human touch is verified.

18. The system of claim 17, further comprising an LED display implement, wherein said LED display implement is configured to visually present for viewing at least one of water temperature, fluid capacity, internal pressure, date, time, battery status, custom messages, liquid/water purity, emojis, communication status, container status, and/or emergency or alarm notification.

19. The system of claim 18, further comprising:
a temperature sensor that is configured to monitor a temperature of the liquid stored within said smart beverage container body, wherein if the temperature of the liquid is above a predetermined high temperature, said display implement would be activated to show a "Hot Liquid" alarm notification;

a pressure sensor that is configured to monitor an internal pressure of said smart beverage container body, wherein if the pressure of the liquid is above a predetermined high pressure, said display implement would be activated to show a "High Pressure" alarm notification; and a capacitive sensing ring, wherein said capacitive sensing ring is configured to detect human contact.

20. The system of claim 19, further comprising:
a wireless communication unit configured to communicate with an external device, wherein sensor data from said smart beverage container device is transmitted to an external device for synchronizing with a cloud-based application for remote access to the sensor data;

a rechargeable battery that is configured to power electrical components of smart beverage container body;

a charger configured to be operable for charging said rechargeable battery.

a processor;

a memory component;

a software algorithm stored in said memory component, wherein said software algorithm is configured to use data from said capacitive sensor and accelerometer implement to verify liquid intake; and wherein at least one of a capacitive sensor data, an accelerometer implement data, a pressure sensor data, a temperature sensor data, and a capacitive sensing ring data is transmitted to an external device for synchronizing with a cloud-based application for remote access to the data.

* * * * *